United States Patent
Datz

(10) Patent No.: US 9,631,779 B2
(45) Date of Patent: Apr. 25, 2017

(54) OPTICAL SYSTEM UTILIZING LED ILLUMINATION FOR A LIGHT BAR, AND LIGHT BAR HAVING SAME

(71) Applicant: Star Headlight & Lantern Co., Inc., Avon, NY (US)

(72) Inventor: R. Michael Datz, Rochester, NY (US)

(73) Assignee: STAR HEADLIGHT & LANTERN CO., INC., Avon, NY (US)

( * ) Notice: Subject to any disclaimer, the term of this patent is extended or adjusted under 35 U.S.C. 154(b) by 16 days.

(21) Appl. No.: 14/459,914

(22) Filed: Aug. 14, 2014

(65) Prior Publication Data
US 2015/0049482 A1 Feb. 19, 2015

Related U.S. Application Data

(60) Provisional application No. 61/866,385, filed on Aug. 15, 2013.

(51) Int. Cl.
| | |
|---|---|
| *F21K 99/00* | (2016.01) |
| *F21V 5/04* | (2006.01) |
| *F21V 13/04* | (2006.01) |
| *B60Q 1/26* | (2006.01) |
| *F21S 8/10* | (2006.01) |
| *F21K 9/20* | (2016.01) |
| *F21V 7/00* | (2006.01) |
| *F21V 7/06* | (2006.01) |
| *F21Y 101/00* | (2016.01) |

(Continued)

(52) U.S. Cl.
CPC .............. *F21K 9/30* (2013.01); *B60Q 1/2611* (2013.01); *F21K 9/20* (2016.08); *F21S 48/215* (2013.01); *F21S 48/2225* (2013.01); *F21S 48/236* (2013.01); *F21V 5/045* (2013.01);

*F21V 7/005* (2013.01); *F21V 7/0091* (2013.01); *F21V 7/06* (2013.01); *F21V 13/04* (2013.01); *F21Y 2101/00* (2013.01); *F21Y 2103/10* (2016.08); *F21Y 2113/13* (2016.08); *F21Y 2113/17* (2016.08); *F21Y 2115/10* (2016.08)

(58) Field of Classification Search
None
See application file for complete search history.

(56) References Cited

U.S. PATENT DOCUMENTS

| | | |
|---|---|---|
| 5,929,788 A | 7/1999 | Vukosic |
| D463,589 S | 9/2002 | Troyer et al. |

(Continued)

*Primary Examiner* — Ashok Patel
(74) *Attorney, Agent, or Firm* — Kenneth J. Lukacher Law Group

(57) ABSTRACT

An optical system is provided having a first optical element for directing LED light received outwards, and two second optical elements each disposed to receive a portion of the light from a different one of two opposing ends of the first optical element so that the second optical elements redirects such portion of the light received outwards. Light from the optical system is preferably collimated along a first dimension, and non-collimated along a second dimension perpendicular to the first dimension. The first optical element and second optical elements are disposed in an integrated structure to facilitate mounting of the optical system upon a circuit board having LEDs which provide light to the first optical element. A light bar is also provided having multiple sets of LEDs on circuit boards, where each set provides light to a different one of the optical systems.

20 Claims, 6 Drawing Sheets

(51) Int. Cl.
*F21Y 103/10* (2016.01)
*F21Y 115/10* (2016.01)
*F21Y 113/13* (2016.01)
*F21Y 113/17* (2016.01)

(56) References Cited

U.S. PATENT DOCUMENTS

| | | |
|---|---|---|
| D518,203 S | 3/2006 | Phillips et al. |
| D530,437 S | 10/2006 | Neufeglise et al. |
| D556,925 S | 12/2007 | Lin |
| D632,421 S | 2/2011 | Vukosic et al. |
| D633,648 S | 3/2011 | Datz |
| 8,192,063 B2 * | 6/2012 | Neufeglise ............ B60Q 1/302 362/249.11 |
| D665,934 S | 8/2012 | Kubo |
| D683,252 S | 5/2013 | Andrew et al. |
| D693,035 S | 11/2013 | Datz et al. |
| 8,662,702 B2 | 3/2014 | Datz et al. |
| D707,579 S | 6/2014 | Datz |
| D712,086 S | 8/2014 | Barbato et al. |
| 9,303,837 B2 | 4/2016 | Watanabe |
| 9,360,169 B2 | 6/2016 | Zhang et al. |
| 2009/0207612 A1* | 8/2009 | Datz ............... B60Q 1/2611 362/249.14 |
| 2010/0073948 A1* | 3/2010 | Stein ............... B60Q 1/2611 362/493 |
| 2012/0057336 A1* | 3/2012 | Farmer ............... F21V 5/00 362/223 |
| 2013/0155670 A1 | 6/2013 | Handsaker |
| 2014/0126964 A1* | 5/2014 | Woo ............... E02B 17/02 405/226 |
| 2014/0268737 A1* | 9/2014 | Athalye ............... F21V 13/04 362/235 |
| 2014/0268747 A1* | 9/2014 | Demuynck ............ F21S 9/022 362/235 |
| 2015/0049476 A1* | 2/2015 | Hsia ............... F21S 8/00 362/223 |
| 2016/0025394 A1* | 1/2016 | Rached ............... C08J 9/146 62/77 |
| 2016/0044776 A1* | 2/2016 | Park ............... H05K 1/0274 362/97.1 |
| 2016/0131330 A1 | 5/2016 | Jiang et al. |

* cited by examiner

OPTICAL SYSTEM UTILIZING LED ILLUMINATION FOR A LIGHT BAR, AND LIGHT BAR HAVING SAME

This application claims the benefit of priority to U.S. Provisional Patent Application No. 61/866,385, filed Aug. 15, 2013, which is incorporated herein by reference.

FIELD OF THE INVENTION

The present invention relates to an optical system for a light bar, such as mounted on the roof of emergency vehicles, and particularly to, an optical system and light bar using same for efficiently utilizing light emitting diode (LED) light to provide warning signals. Multiple optical systems may be provided in a light bar to provide illumination therefrom in multiple directions.

BACKGROUND OF THE INVENTION

Light bars are mounted on the roof of emergency vehicles to provide warning signals. Traditionally light bars have used lamps or light bulbs for generating illumination which are directed outward by reflectors and/or lenses. With the wide availability of light emitting diodes (LEDs) there has been a trend to utilize LEDs in light bars to obtain the benefit of longer life and lower power utilization than traditional lamps. However, mere substitution of LEDs for traditional lamps in light bars is difficult due to their different form factors and need for multiple LEDs to achieve comparable illumination output. Accordingly, optical elements and systems are needed which can efficiently collect light from LEDs and direct it outwards along desired dimensions to provide proper illumination for use in light bars.

SUMMARY OF THE INVENTION

Accordingly, it is the principal object of the present invention to provide an improved optical system for a light bar utilizing LEDs.

It is another object of the present invention to provide an improved optical system for use in a light bar mountable to a vehicle having two side optical elements each disposed to receive a portion of the light that passed through opposing ends of a central optical element that is disposed over LEDs, so that the side optical elements redirect light from the central optical element that would otherwise not extend outward from the optical system as desired.

Briefly described, the optical system of the present invention has a first optical element and a pair of second optical elements along different opposite ends of the first optical element. The first optical element extends along a first dimension and has a first body for receiving light from LEDs, and surfaces to provide from the first body collimated light in a second dimension perpendicular to the first dimension, and non-collimated light outwards along the first dimension. The second optical elements are each disposed with respect to a different one of two opposing ends of the first optical element to receive a portion of the illumination therefrom. Each second optical element has a second body having surfaces to provide from the first body collimated light in a second dimension and non-collimated light outwards along the first dimension. The first and second dimensions may represent horizontal and vertical dimensions, respectively.

The body of the first optical element preferably has a cavity for receiving the LEDs, a front surface having a central longitudinal lens along the first dimension, and a pair of side surfaces each extending in steps (or other shaped surface) from opposing longitudinal sides of the lens, and parabolic outer sides for reflecting light received from the cavity through such side surfaces. The parabolic outer surface reflects light from the cavity as collimated light in the second dimension, and non-collimated light in the first dimension, to exit the first optical element via the side surfaces. The longitudinal lens refracts light received from the cavity as collimated light in the second dimension, and non-collimated light in the first dimension, to exit the first optical element.

The first and second optical elements are preferably integrated in a unitary structure to facilitate mounting on a circuit board having LEDs properly positioned in the cavity of the first optical element. The first and second optical elements may be integrated with each other along a wall or frame to provide such unitary structure, in which such wall or frame is partly formed by the body of each of the first and second optical elements.

The body of each of the second optical elements preferably has a light entrance surface for light from one of the ends of the first optical element, an outer surface of a partial parabolic shape, and a front surface extending in steps (or other shaped surface) upwards, in which light received from the light entrance surface is reflected by the outer surface to exit the second body via its front surface as collimated light in the second dimension and non-collimated light in the first dimension. The second optical elements are each spaced from the first optical element and mirror each other along different ends of the optical system.

The present invention also embodies an apparatus having multiple LEDs, and a first optical element for receiving light from the LEDs and directing the light outwards along an angular range. The angular range has two angular regions thereof near each of the two opposite ends of the angular range. Two second optical elements are provided, each disposed to receive light from the first optical element from a different one of the two angular regions, and to redirect the light outwards away from the second optical element. The first and second optical elements are preferably integrated together into a unitary structure to facilitate mounting on a circuit board upon which the LEDs are mounted, so that the LEDs are disposed in a cavity of the first optical element and provide light to the first optical element over the angular range.

The present invention also provides a light bar comprising multiple optical elements described above to provide light from the light bar in multiple directions.

BRIEF DESCRIPTION OF THE DRAWINGS

The foregoing and other objects, features, and advances of the invention will become more apparent from a reading of the following description in connection with the accompanying drawings in which.

DETAILED DESCRIPTION OF THE INVENTION

Figure 1:
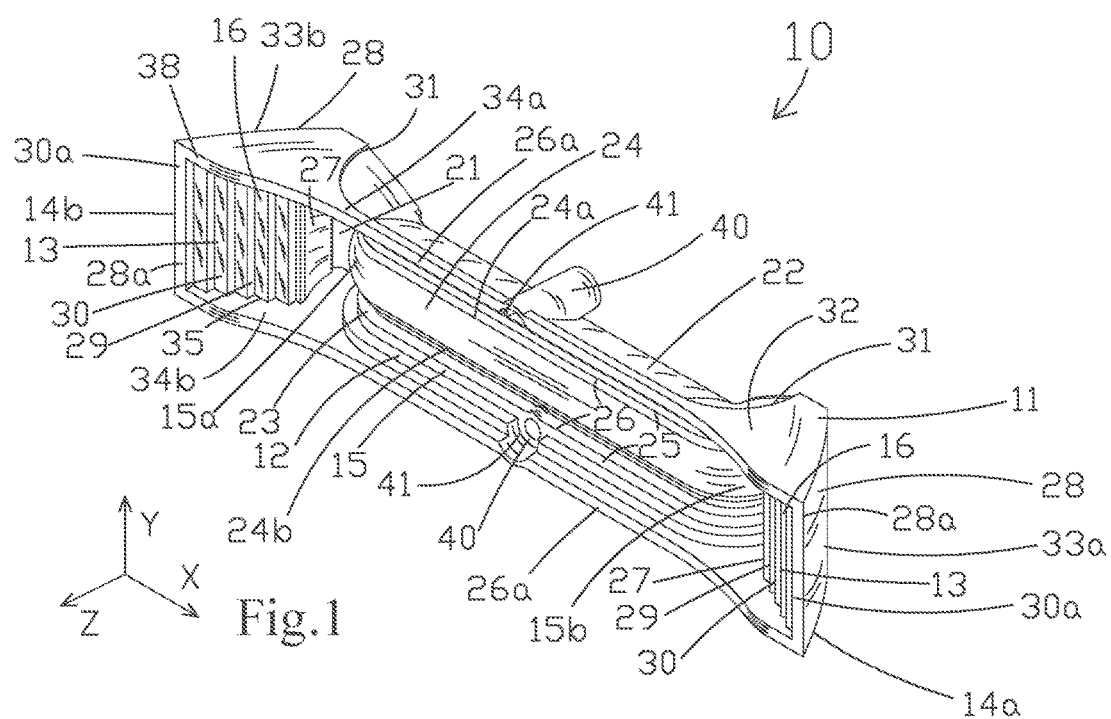
FIG. 1 is a perspective view of the front of an optical system of the present invention.

Referring to FIGS. 1, 2, 3 and 4, an optical system 10 is shown having a unitary structure 11 of a first optical element 12 disposed centrally between two second optical elements 13 that form the ends 14a and 14b of structure 11. Optical elements 12 and 13 are made of transparent optical material, such as molded plastic. The transparent optical material may be clear or of a desired color.

Figure 2:
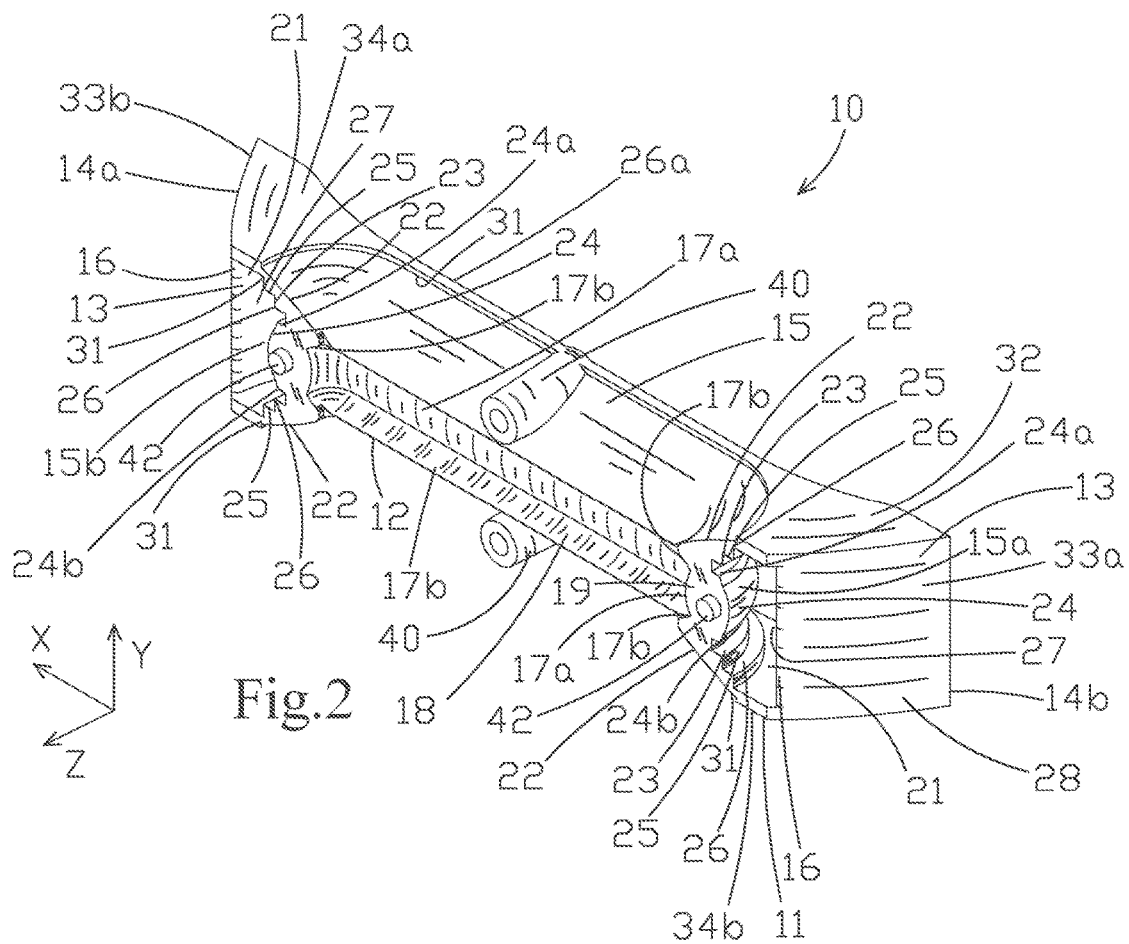
FIG. 2 is a perspective view of the back of the optical system of FIG. 1.
Figure 3:
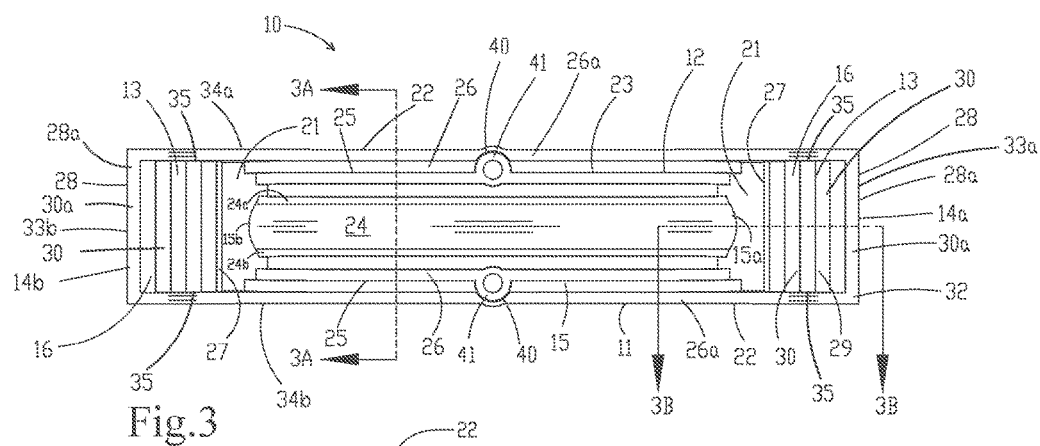
FIG. 3 is a front view of the optical system of FIG. 1.
Figure 3A:
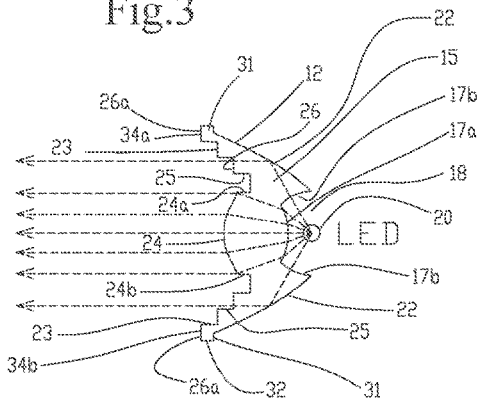
FIG. 3A is a cross-sectional view along lines 3A-3A of FIG. 3 in the direction of the arrows at the end of these lines.

Optical element 12 has a body 15 with a central wall 17a and two side walls 17b (FIG. 2) defining a rear cavity 18 for receiving light from multiple LEDs 20 (see e.g., FIG. 6), upper and lower parabolic surfaces 22, and a front surface 23 (FIG. 1). The body 15 is elongated along the x-axis, and then curves rearwardly to then extend along the z axis at its ends 15a and 15b. Wall 17a of cavity 18 is a central longitudinal convex surface for refracting light from LEDs 20 towards a central longitudinal lens 24 of front surface 23. Lens 24 has a curved surface concave along the y-axis so that it collimates light along the y-axis and allows light to spread outwardly horizontally over a wide angle along the x-axis. Each side wall 17b of cavity 18 (FIGS. 2 and 4) is a spherical surface for refracting light towards either the upper or lower parabolic surfaces 22, which by total internal reflection reflects and collimates light along the y-axis, while also allowing light to spread outwardly, horizontally, over a wide angle along the x-axis. See dashed arrows of FIG. 3A illustrating light rays through optical element 12 for the example of a single LED 20. Generally, the x and y axes refer to the horizontal and vertical dimensions, respectively.

Front surface 23 has a pair of upper and lower surfaces 25 extending in steps 26 upwards towards the front of structure 11 from opposing longitudinal sides 24a and 24b of lens 24. Light reflected from upper and lower parabolic surfaces 22 extends through upper and lower surfaces 25, as also shown by the light rays in FIG. 3A. The upper edge 31 of optical element 12 is where upper and lower surfaces 25 of front surface 23 meet along top of upper and lower parabolic surfaces 22, respectively. When body 15 curves rearwardly along its ends 15a and 15b, only such steps 26 of upper and lower surfaces 25, below their uppermost steps 26a, rearwardly curves (see FIG. 1), as the uppermost step 26a is utilized for coupling optical element 12 to optical elements 13 of structure 11, as described below. Upper and lower surfaces 25 of front surface 23 mirror each other on opposite sides of optical element 12. Steps 26 of upper and lower surfaces 25 increase in length as they extend upwards from sides 24a and 24b of lens 24.

Figure 3B:
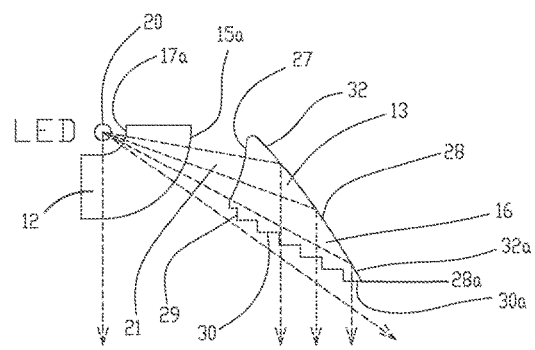
FIG. 3B is a cross-sectional view along lines 3B-3B of FIG. 3 in the direction of the arrows at the end of these lines.
Figure 4:
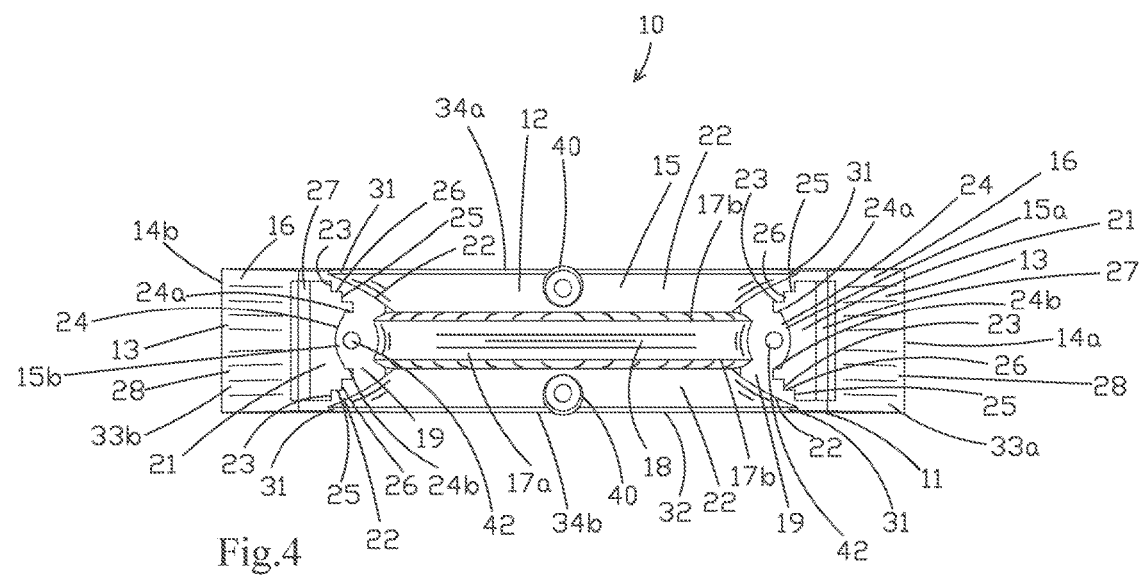
FIG. 4 is a back view of the optical system of FIG. 1.

Each of optical elements 13 has a body 16 spaced by a gap 21 at an equal distance from one of different ends 15a and 15b of optical element 12 so as to receive a portion of the LED light that may pass therefrom. The body 16 of each optical element 13 has a light entrance surface 27, a partially parabolic surface 28, and a front surface 29. The light entrance surface 27 may be curved and receives light from the one of ends 15a and 15b of optical element 12 via gap 21. Light received through surface 27 travels towards partial parabolic shaped surface 28 which by total internal reflection reflects such received light as collimated light only along the y-axis through front surface 29, as shown in FIG. 3B by light rays denoted by dashed arrows incident surface 28 for the example of a single LED 20. Light of LED 20 received by surface 27, via gap 21, preferably is not refracted by optical element 12, as shown in FIG. 3B. Front surface 29 has steps 30 which upwardly extend from the front edge 27a of surface 27 so that the upper edge 28a of surface 28 meets the uppermost step 30a of front surface 29.

Structure 11 has an outer wall or frame 32 that couples optical elements 12 and 13 together. Wall 32 has right and left end walls 33a and 33b, respectively, and top and bottom walls 34a and 34b, respectively. Left and right optical elements 13 each have upper and lower sides 35 (FIG. 3) which joined between walls 34a and 34b at ends 14a and 14b, respectively, in structure 11. The right and left end walls 33a and 33b are formed by the uppermost step 30a of front surface 29 and the exterior of partial parabolic surface 28 of left and right optical elements 13, respectively. Upper and lower walls 34a and 34b may be contoured as shown in FIG. 1 and form with uppermost step 26a of upper and lower surfaces 25, respectively, of optical element 12, and further join with optical element 12 along edge 31 at top of parabolic surfaces 22, as shown in FIG. 2. The uppermost steps 26a and 30a form part of the front edge of wall 32 of structure 11. Frame or wall 32 may be formed, such as molded, along with optical elements 12 and 13 and may be of the same translucent plastic material as such optical elements 12 and 13.

Thus, optical elements 13 mirror each other at opposite ends 14a and 14b of structure 11 and are each positioned a distance along gaps 21 with respect to optical element 12 so light from LEDs 20 is directed outwards by optical element 12 along a wide angular range, as described above. The two optical elements 13 each receive light from optical element 12 along two angular regions near the ends of such angular range of LEDs 20. See dashed arrows of FIG. 3B illustrating light rays to surface 27 for the example of a single LED 20. In this manner, a portion of the light from LEDs 20 along such two angular regions that would otherwise be lost after exiting optical element 12 is captured by optical elements 13 and then redirected, as described above, outwards from optical elements 13.

Although steps 26 are provided along upper and lower surfaces 25 of optical element 12, and steps 30 are provide along front surfaces 29 of optical elements 13, such steps 26 and 30 may be considered ornamental in nature, and other surfaces than steps 26 and/or steps 30 may be used, such as flat or otherwise contoured, as may be desired to reduce the thickness of optical elements 12 and 13 without effecting the desired collimation of light along the y-axis. However, alternatively upper and lower surfaces 25 and front surfaces 29 may be shaped to provide a desired refraction of light.

Figure 5:
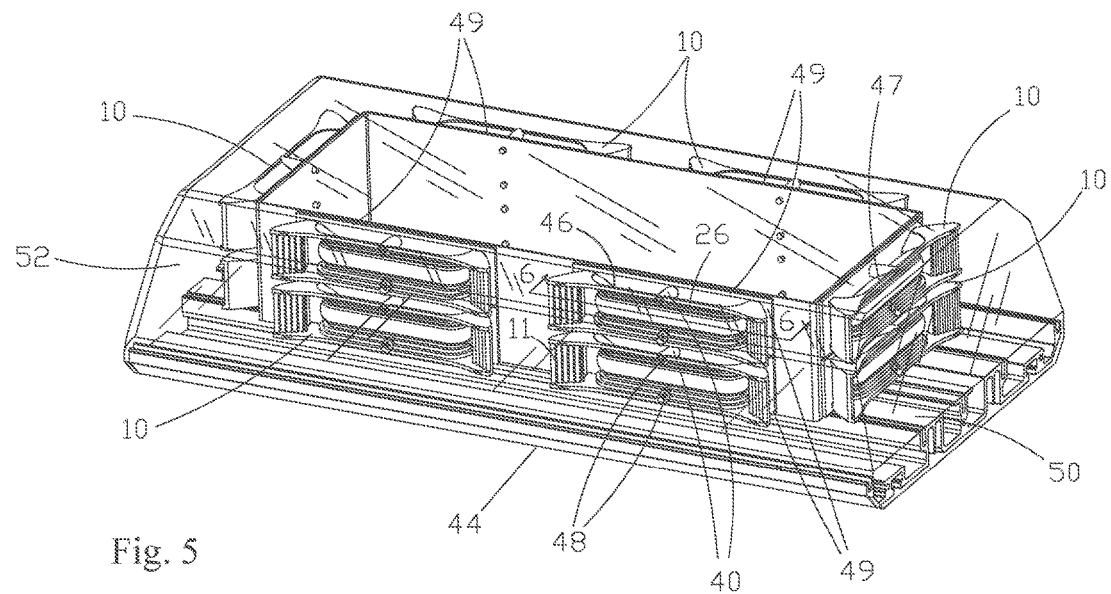
FIG. 5 is an example of a light bar with multiple optical systems of FIG. 1.
Figure 6:
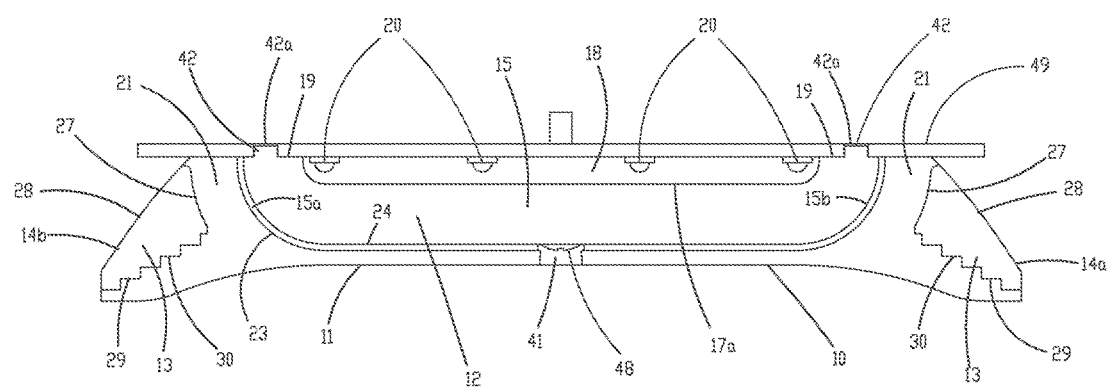
FIG. 6 is a cross-sectional view along lines 6-6 of FIG. 5 in the direction of the arrows at the end of these lines for one of the optical systems mounted on a circuit board of FIG. 5.

Referring to FIG. 5, an example of a light bar 44 is shown having multiple optical systems 10 in a two-dimensional array 46, or one-dimensional array 47, where each structure 11 with optical systems 10 is mounted onto a circuit board 49. Structures 11 may share a common circuit board 49 in each array of such structures. FIG. 6 shows a cross-section of an optical system 10 of FIG. 5 mounted to its associated circuit board 49, so that LEDs 20 are disposed in cavity 18 to provide all (or substantially all) their light to that optical system over a wide angular horizontal range. In optical system 10, the portion of light from any of the LEDs 20 that extends toward surfaces 27 of optical elements 13, via optical system 12, is redirected by optical elements 13 outwards, and the rest of light from LEDs 20 is directed by optical element 12 or via gaps 21, outwards, so that all (or substantially all) the light from LEDs exits optical system 10 and thus light bar 44.

To facilitate mounting of each structure 11, cylinders 40 are molded for receiving screws 48 along recessed ledge 41 in optical element 12 (see FIGS. 1-4 and 6). Alignment tabs 42 extend from flat rear back surface 19 of optical element 12 into openings or holes 42a along circuit board 49 for aligning structure 11 flush, and properly positioning LEDs 20 in cavity 18 of optical element 12. Each of the optical systems 10 may be similarly mounted using their respective alignment tabs 42 and each fixed by screws 48 (and nuts if needed) via openings extending through their respective cylinders 40 to circuit boards 49.

Circuit boards 49 are disposed along four sides of light bar 44, and have electronics for controlling power to LEDs and thus illumination in multiple directions from the light bar. Circuit boards 49 are supported by a base 50 of light bar 44. A dome 52 of desired color plastic is positioned over the assembly of circuit boards 49 and optical systems 10 mounted thereto and snapped (or otherwise retained) onto the outer edges of base 50.

In each optical system 10, its LEDs 20 may provide light of the same color, or LEDs may provide different color light, or the same LED 20 may have multiple elements selectable to provide light of different colors. As such, different optical systems 10 of a light bar may provide light of the same or different color, as desired. LEDs 20 associated with each optical system 10 may be considered [a] part of such optical system.

The LEDs 20 shown in FIG. 6 represent one set or bank of LEDs, in which each set provides light to a different one of the optical systems 10. Although such set is shown as a one-dimensional array of four LEDs 20, other numbers of LEDs may be used, either in a one or two-dimensional array. Further, optical system(s) 10 may be mounted in other light bars than the light bar shown in FIG. 5 to provide illumination therefrom.

From the foregoing description it will be apparent that an improved optical system for LED illumination and light bar using same has been provided. Variations and modifications herein this described system, apparatus, and method will undoubtedly suggest themselves to those skilled in the art. Accordingly the foregoing description should be taken as illustrative and not in a limiting sense.

The invention claimed is:

1. An optical system for a light bar comprising:
a first optical element having two opposing ends;
two second optical elements each disposed with respect to said first optical element to receive a portion of light exiting from a different one of said two opposing ends of said first optical element and to redirect the portion of the light received outwards when said first optical element receives illumination; and
each of said second optical elements has a body comprising a first surface and a second surface, in which said second surface redirects outward said portion of light exiting from one of said two opposing ends of said first optical element received via said first surface.

2. The optical system according to claim 1 wherein said body of each of said second optical elements represents a second body, said first optical element has a first body extending along a first dimension for receiving said illumination, and said first body comprises surfaces to provide from said first body light outwards from said first body which is collimated in a second dimension perpendicular to the first dimension and non-collimated in the first dimension, and said second surface of said second body operates on said portion received to redirect light outwards from said second body which is collimated in the second dimension and non-collimated along said first dimension.

3. The optical system according to claim 2 wherein said surfaces of said first body comprise at least a front surface and a parabolic shaped outer surface, and said first body further comprises:
a rear cavity for receiving light sources which provide said illumination;
said front surface having a central longitudinal lens along said first dimension and a pair of side surfaces extending from opposing longitudinal sides of said lens; and
said parabolic shaped outer surface reflecting light received from said cavity to said side surfaces, in which light reflected by said parabolic outer surface is collimated in said second dimension and non-collimated in said first dimension when exiting said first optical element via said side surfaces, and said longitudinal lens refracts light received from said cavity, in which said light refracted by said longitudinal lens is collimated in said second dimension and non-collimated in said first dimension when exiting said first optical element.

4. The optical system according to claim 3 wherein said pair of side surfaces each extends in steps from opposing longitudinal sides of said lens.

5. The optical system according to claim 3 wherein said surfaces of said first body further comprise surfaces along said cavity for refracting received illumination to one of said front surface and said parabolic shaped outer surface.

6. The optical system according to claim 2 wherein
said first surface represents a light entrance surface for said portion of illumination received from one of the ends of the first optical element; and
said second surface represents an outer surface having a parabolic shape which reflects light received from said light entrance surface, in which light reflected by said outer surface is collimated in the second dimension and non-collimated in the first dimension when exiting said second optical element via said front surface.

7. The optical system according to claim 6 wherein said second optical elements mirror each other.

8. The optical system according to claim 6 wherein said second body further comprises a front surface having steps.

9. The optical system according to claim 1 wherein said first and second optical elements are integrated with each other along a wall which is partly shared by each of said first and second optical elements.

10. The optical system according to claim 1 wherein said illumination is provided by LEDs.

11. The optical system according to claim 1 wherein said first and second optical elements are integrated in a unitary structure, and said optical system further comprises features along said unitary structure for aligning said optical system upon a circuit board having light sources which provide said illumination.

12. A light bar comprising a plurality of said optical systems of claim 1 disposed to provide light from the light bar in multiple directions.

13. The optical system according to claim 1 wherein said first and second optical elements are of transparent optical plastic material molded in a unitary structure.

14. The optical system according to claim 1 further comprising a gap between said first optical elements and each of said second optical elements through which said portion of light exiting from a different one of said two opposing ends of said first optical element portion passes through.

15. An apparatus providing illumination comprising:
  a plurality of LEDs;
  a first optical element for receiving light from said LEDs and directing said light outwards, in which said first optical element has two opposing ends; and
  two second optical elements each having a first surface disposed to receive a portion of the light from a different one of said two opposing ends of said first optical element, a second surface, and a third surface having curvature to reflect by total internal reflection said portion of the light received via said first surface outwards via said second surface.

16. The apparatus according to claim 15 further comprising a gap between each of said two second optical elements and said first optical element.

17. The apparatus according to claim 16 further comprising a frame having said first optical element and second optical elements.

18. The apparatus according to claim 15 wherein said first optical element and said second optical elements each collimate light outwards along a common dimension.

19. The apparatus according to claim 15 wherein said first optical element directs said light from said LEDs outwards along an angular range, in which said angular range has two angular regions near each of the two opposite ends of said angular range, and each of said second optical elements receives light for a different one of two angular regions from said first optical element.

20. The apparatus according to claim 15 further comprising a circuit board, wherein said LEDs are mounted on said circuit board, and said first optical element has a cavity and is mounted onto said circuit board so that said LEDs are disposed in said cavity to provide light to said first optical element.

* * * * *